United States Patent [19]

Sticht

[11] Patent Number: 5,053,173
[45] Date of Patent: Oct. 1, 1991

[54] PROCESS AND APPARATUS FOR MANUFACTURING PLASTIC MOULDINGS

[76] Inventor: Walter Sticht, Karl-Heinrich-Waggerl-Str.8, A-4800 Attnang-Puchheim, Austria

[21] Appl. No.: 474,805
[22] PCT Filed: Dec. 16, 1988
[86] PCT No.: PCT/AT88/00112
§ 371 Date: Aug. 16, 1990
§ 102(e) Date: Aug. 16, 1990
[87] PCT Pub. No.: WO89/05719
PCT Pub. Date: Jun. 29, 1989

[30] Foreign Application Priority Data

Dec. 17, 1987 [AT] Austria ................................. 3324/87

[51] Int. Cl.⁵ .............................................. B29C 45/04
[52] U.S. Cl. ...................................... 264/39; 264/241; 264/297.2; 264/297.8; 264/328.11; 264/328.16; 425/117; 425/129.1; 425/225; 425/547; 425/575; 425/588; 425/357
[58] Field of Search ............... 264/39, 241, 294, 297.1, 264/297.2, 297.6, 297.7, 328.8, 328.11, 328.16; 425/116, 117, 125, 129.1, 225, 232, 547, 552, 574, 575, 588, 357

[56] References Cited

U.S. PATENT DOCUMENTS

| | | | |
|---|---|---|---|
| 3,754,848 | 8/1973 | Choate | 425/589 |
| 3,973,891 | 8/1976 | Yamada | 425/578 |
| 3,982,869 | 9/1976 | Eggers | 425/575 |
| 4,555,228 | 11/1985 | Nishiike | 425/575 |
| 4,861,258 | 8/1989 | Margiaria et al. | 425/575 |

FOREIGN PATENT DOCUMENTS

| | | | |
|---|---|---|---|
| 246398 | 2/1987 | European Pat. Off. | 425/575 |
| 1145786 | 3/1963 | Fed. Rep. of Germany. | |
| 2254356 | 11/1972 | Fed. Rep. of Germany. | |

Primary Examiner—Jill L. Heitbrink
Attorney, Agent, or Firm—Collard, Roe & Galgano

[57] ABSTRACT

A process for manufacturing moldings of plastic material includes successive cycles of conveying a succession of mobile molding tool parts independently of each other along lateral and vertical guideways of a conveyor to a work station holding a basic molding tool part. Each cycle includes the steps of joining the mobile molding tool part and the basic molding tool part together at the work station to close the mold cavity in the mobile tool part, dispensing the plastic material into the closed mold cavity from a dispensing device, imparting a predetermined temperature to the mold cavity to permit the plastic material in the mold cavity to harden into a shape-retaining molding, separating the basic molding tool part from the mobile molding tool part after the molding has hardened, conveying the mobile molding tool part holding the molding in the mold cavity thereof independently of succeeding mobile molding tool parts to at least one succeeding work station for further treatment, and ejecting the molding from the mold cavity.

26 Claims, 6 Drawing Sheets

PROCESS AND APPARATUS FOR MANUFACTURING PLASTIC MOULDINGS

BACKGROUND OF THE INVENTION

1. Field of the Invention

The invention relates to a process and apparatus for manufacturing mouldings of plastic material, in which the plastic material is introduced by a dispensing device into a mould cavity of a tool comprising a basic part and several mobile parts and is retained in the mould cavity until adequate stability of shape is attained, whereupon the moulding is ejected.

2. Description of the Prior Art

In a known method and a device suitable for carrying out the latter in accordance with DE-B-11 45 786, for the manufacturing of plastic parts, there are associated with a basic part of the tool several mobile tool parts which are fixedly arranged on a rotatable table plate. The table plate is turned gradually, so that the mobile tool parts are connected successively with the basic tool part and plastic material can be injected into the corresponding mould cavities. It is a disadvantage that in this method and the known device, the cycle time on even the mobile tool parts at a distance from the basic tool part is dependent on the cycle time for the manufacture of the moulding.

It is already known to use so-called mould carousels for the purpose of manufacturing plastic moulding which require a longer cycle time between the introduction of the liquid plastic material into the mould cavity and the removal of the moulding. The carousels usually comprise a turntable on which a plurality of moulds are disposed one behind the other around the periphery thereof at equal angular distances apart. The mould located opposite the dispensing device is filled with plastic material, whereupon the turntable is rotated through a further angular spacing, so that the next mould may be filled with liquid plastic material. In the meantime, the mould is opened in the region of the other moulders, the moulding is removed, and the mould cavity is cleaned and recoated with a parting agent. Processes and installations of this kind are widely used, although the costs of manufacturing a large number of complete moulds is relatively high, and the spatial requirements are also relatively high if several working operations are to be performed in succession.

SUMMARY OF THE INVENTION

The object of the present invention is to provide a process and an apparatus for the manufacture of mouldings from plastic material, which process and installation meet requirements with a short injection time for the individual moulding and with a low closing pressure. Furthermore, universal use of the process and the apparatus is to be made possible even in the case of small mouldings with a short injection time. Moreover, the work required between the individual injection operations is to be capable of being performed so as to be unrestricted, as far as possible, by the station time of the actual injection operation.

This object of the invention is solved in that the mobile parts of the tool are movable independently of each other along a lateral and/or vertical guideway of a conveyor and are brought in succession into the working region of the basic part of the tool and at least therein are connected with a cooling and/or heating circuit and the tool parts are joined together into a closed mould cavity, whereupon the plastic material is introduced into the mould cavity, and that the basic part of the tool and the mobile part of the tool are separated from one another after a reaction time has elapsed, and the mobile part of the tool together with the moulding, independently of the other mobile parts of the tool, is subjected to a further treatment, and a following mobile part of the tool with an empty mould cavity is connected to the basic part of the tool, and plastic material is introduced into the empty mould cavity. The advantages of this unexpectedly simple solution reside in the fact that only one of numerous tool parts of the same construction is required at any one time, while the other part of the tool is only present in the region of the dispensing device. However, the duplication of the other part of the tool advantageously makes it possible to raise one part of the tool immediately after the first hardening phase or after the termination of the shaping phase, while the moulding can remain in the other part of the tool for as long as is required until the cooling phase has terminated. However, it is possible during this time to convey this moulding with the workpiece carriers to any work stations where further assembly, inscription or coating operations, such as lacquering and the like may be performed, or, for example, further parts may be mounted onto the moulding. Therefore, a correspondingly large number of moulding tool parts makes it possible to use them simultaneously as holders for the moulding for subsequent processing operations. Clamping of the moulding corresponding to the hardening time may also be achieved without any disadvantageous change in the injection cycle. Also, the temperature treatment of the mouldings can take place over the entire working region in any desired form, so that desired cooling cycles and hardening processes of the mouldings are possible. Furthermore, this type of processing makes it readily possible to use manual labour, without affecting the machine cycle, which can undertake the cleaning of the mould cavities and the coating of the mould cavities with parting agent. It is also very readily possible during a working process unrestricted by the working cycle to use manual labour to insert into the mould cavities individual parts which are to be moulded into the moulding or surrounded by the plastic material during the process.

However, it is also possible to guide the mobile parts of the tool on a lateral and/or vertical guideway of a conveyor and for the basic part of the tool to be adjustable at right angles to the guideways, a portion of the closing force preferably being diverted into a base by way of the conveyor, whereby the parts of the tool are centred relative to one another with great accuracy in the region of the work station in which they are joined together to form the mould cavity, wherein the installation may be constructed in simpler manner as a result of the conveyor taking up a portion of the closing force.

Further measures are also advantageous by which the dispensing device is coupled to the mould cavity, or to a gate for the mould cavity, during or after coupling of the basic part of the tool to the mobile part of the tool, since only the parts dispensing the liquid plastics material and the stationary part of the moulding tool have to be moved at any one time in order to form the mould cavity or to charge the mould cavity with liquid plastic material.

Furthermore, it is also possible to adjust the dispensing device at right angles to the basic part of the tool and/or the conveyor. As a result of the different directions of movement of the part of the moulding tool and the dispensing device, and of the part of the tool conveyable by the conveyor, the closing and opening time, that is, the time required to move the parts of the tool into their desired positions relative to one another before the liquid plastics material has been introduced or after it has been introduced, and then to bring them into a position in which they are separated from one another, can be kept very short, so that the part of the injection tool moved by the conveyor has to be kept stationary for only a minimum period of time in the region of the drive.

In accordance with another variant of the process, the mobile parts of the tool are guided without play and are stopped and positioned in a position in alignment with the basic part of the tool, whereupon the basic part of the tool is pressed against the mobile part of the tool, and, if necessary, the mobile part of the tool and the basic part of the tool are centred relative to one another, and, after the moulding has been produced, the basic part of the tool is removed from the mobile part of the tool, and the mobile part of the tool is conveyed to the next working region. This operating sequence of the process is distinguished particularly by the fact that fairly accurate positioning of the part of the tool conveyed by the conveyor is attained. Furthermore, precision adjustment, which is in the range of 0.001 mm and less in these types of tools for mould cavities, may be obtained whilst the two parts of the tool are being moved together.

It is also advantageous if the moulding is ejected from the cavity in the mobile part of the tool in a working region spaced from the basic part of the tool, since, during conveyance of the moulding from the dispensing device into the region in which it is ejected, the moulding is thereby further cooled and can further solidify without thereby prolonging the injection cycle time.

However, it is also advantageous if several mobile parts of the tool or mould cavities are disposed on one workpiece carrier and, in particular, are simultaneously connected to the basic part of the tool and connected preferably in succession to the dispensing device, since several mould cavities disposed one behind the other on the workpiece carrier may thereby be filled with the liquid plastic materials, and mouldings may be produced, when a workpiece carrier is moving through a working region. The change times between the manufacture of individual mouldings can thereby be shortened and, moreover, only one cooling period is required, since the moulding tool remains closed over the entire period of filling the individual mould cavities. Consequently, when, for example, manufacturing several mouldings which require a longer cooling time before the two parts of the tool can be opened, this longer dwell time is only required once, that is, in the case of the last mould cavity, and is distributed to most of the mouldings in the workpiece carrier.

In accordance with a further variant, the mouldings held in the mould cavity of the mobile part of the tool are processed and/or connected to, or assembled with, further parts, whereby the mould cavity may be used simultaneously as a holder for the basic part of a component to be manufactured and comprising several parts. Additional expensive holders and receivers for assembly workpiece carriers are thereby saved, so that the higher cost of a slightly larger number of tool carriers is justified.

It is also possible to remove the moulding from the mould cavity of the mobile part of the tool particularly after further parts have been assembled, and then to clean the mould cavity and coat it with a parting agent, whereby the mould cavity may also be cleaned and coated with a parting agent independently of the dispensing device.

In accordance with a further variant of the process, a part is preferably automatically positioned in the mobile part of the tool after the mould cavity has been cleaned, and the mobile part of the tool is then conveyed to the basic part of the tool, whereby the possibility of processing independently of the station times may also be readily used for the positioning of inserts in mouldings, it also being possible to use manual labour for this purpose, since, when using a loose interlinkage for the workpiece carriers, it is not dependent upon the operating cycle of the dispensing device. The dwell times occurring in the case of manual labour, such as visits to the toilet, obtaining materials and the like, may be bridged by corresponding workpiece carrier buffers between the manual work place and the dispensing device.

In accordance with a further embodiment, after the moulding has been produced, the mobile part of the tool is conducted to a working region in which the moulding is removed manually, so that, in the case of complicated mouldings, the removal of the moulding may be assisted by the manual labour, whereby highly complicated devices having, for example, inserted cores and the like, may be processed in a simpler manner.

However, it is also advantageous if, after the moulding has been produced, it is conducted together with the mobile part of the tool into a work station in which the moulding is subjected to thermal treatment, since thermal treatment with tempering or the like may be effected during the course of the secondary treatment of the moulding when in its position in which it is clamped at least for the most part in the mould.

The invention also includes an apparatus for the manufacture of mouldings of plastics material, having a dispensing device for the plastics material and a multi-part tool having a basic part and a mobile part and a moulding ejector associated therewith, for performing the process. This apparatus is characterised in that several uniform mobile parts of the tool are disposed on spaced workpiece carriers of a conveyor, which are movable independently of each other, and are provided with a heating and/or cooling circuit, and that a positioning device is associated with the workpiece carrier in a work station associated with the basic part of the tool, and that the mobile part of the tool and the basic part of the tool are mounted so as to be adjustable relative to one another by way of an adjusting device. Advantageously, by virtue of the construction of the apparatus, the parts of the tool may be positioned so accurately by the conveyor that it is readily possible to join the parts of the tool with the accuracy required for mould cavities or moulds of this type. Advantageously, by virtue of using a conveyor for transporting the parts of the tool, the dispensing device for the plastic material may be connected to a follow-up apparatus of optional size in which manual work places may be incorporated when using a "loose" interlinkage for the workpiece carriers receiving the parts of the tool. This is possible owing to the fact that, by virtue of the loose interlinkage, there is no rigid timing interlinkage with the dispensing device, that is, the plastics material injection or extrusion machine. Furthermore, the temperatures favourable for plastics material working can be maintained simply.

It is also advantageous if a centering and/or locking device is disposed between the basic part of the tool and the mobile part of the tool, since a large part of the forces occurring during the filling of the mould cavity with liquid plastic material, or during the reaction thereof, can then be absorbed by a direct motional connection between the two parts of the tool.

In accordance with a further embodiment, the ejectors are disposed in the mobile part of the tool connected to the workpiece carrier. By virtue of the fact that the ejectors are disposed in the part of the tool moving with the conveyor, the mouldings may be ejected from the mould cavity at any point in the course of the conveyor. Thus, it is possible to determine the most favourable period for, or the instant of, removal of the moulding from the mould in accordance with the plastic material used and the characteristic of the moulding. By actuating the ejectors from below the guideway of the conveyor, it is possible to remove the moulding at any point on the conveyor without interfering with the movement of the latter.

It is also advantageous if the mobile part of the tool forms the workpiece carrier, since the mould cavity may used at the same time to hold the moulding for subsequent processing, for assembly, for inscribing or for mechanical processing.

However, it is also possible for the dispensing device to be adjustably mounted in a guide arrangement having a feed drive. The movement of the dispensing device, or of the worm arrangement connected thereto, or of the extruder, may thereby be reduced to the absolute minimum, irrespective of the adjusting travel required for separating the parts of the tool.

It is also advantageous if one adjusting direction of the adjusting device, one conveying direction of the guide arrangement, and one conveying direction of the workpiece carriers of the conveyor extend at an angle, particularly at right angles, to one another, since this can largely prevent mutual hindrance of the adjusting operations of the individual parts of the device, whereby the time between the entry of the part of the tool in the working region of the dispensing device and the commencement of the introduction of the plastics material may be kept short, as well as the time following the introduction of the plastics material until the part of the tool has left its working place.

In accordance with a further embodiment, the conveyor has lateral and vertical guideways and a drive system for the workpiece carriers. This makes it possible to move the workpiece carriers outside the dispensing point of the dispensing device in an optional manner.

It is advantageous if several work stations spaced apart in the conveying direction are disposed along the conveyor, since the moulding may then be conducted to various assembly or processing operations immediately after it has been produced, without the necessity for intermediate manipulation or intermediate storage.

In accordance with another variant, a drive device of an ejector device for the ejectors disposed in the mobile part of the tool is provided in one work station. The moulding may then be ejected from the mould at any location of the conveyor.

Furthermore, it is advantageous if an assembly device for joining and/or connecting a further component part to the moulding is disposed in one work station, since simple assembly operations may then be effected immediately following the production of the moulding, and a preassembled subassembly or a finished component is then present at the end of the work stations.

However, it is also possible to dispose in one work station a processing device for the mould contained in a mould cavity, whereby the external shape or guide surfaces of the moulding may be processed immediately after the mould has been shaped or, if expedient, before it has finally hardened.

Furthermore, it is advantageous if a cleaning device for the mould cavity in the mobile part of the tool is disposed in one work station, whereby the part of the tool may be used for introducing the further plastic material before the part of the tool enters the region of the dispensing device.

In accordance with a further embodiment, the mould cavity is in the form of an assembly holder, whereby there is no need to manufacture complicated holders for mouldings for further processing or assembly.

It is also advantageous if the basic part of the tool is connected to a follow-up device extending parallel to the feed direction of the conveyor, so that "continuous" production of mouldings becomes possible without having to arrest the workpiece carrier or the parts of the tool during manufacture of the moulding. The advantage of this device resides in the fact that the times for arresting the workpiece carriers and the parts of the tool do not adversely change the cycle time for the manufacture of the moulding.

In accordance with another development, several mould cavities are disposed one behind the other in the conveying direction of the conveyor in a mobile part of the tool on a workpiece carrier, so that, for example, in the case of mouldings requiring a longer hardening time with the mould closed, the time consumed by the manufacture of several mouldings in one mould can be shortened, since the full hardening time is used only for the last moulding in a workpiece carrier, and the total cycle time is apportioned to the mouldings manufactured with one part of the tool.

Finally, it is also advantageous if insert parts and/or cores which are removable and/or adjustable relative to the mould cavity of the mobile part of the tool are disposed therein, since the drawing of cores and the opening of partial regions and the removal of core parts is possible both manually and automatically in a stepped manner according to the progress of the hardening of the moulding manufactured in the tool.

BRIEF DESCRIPTION OF THE DRAWING

To improve comprehension of the invention, it will be further described hereinafter with reference to the embodiments illustrated in the drawings, in which.

DESCRIPTION OF THE PREFERRED EMBODIMENTS

Figure 1:
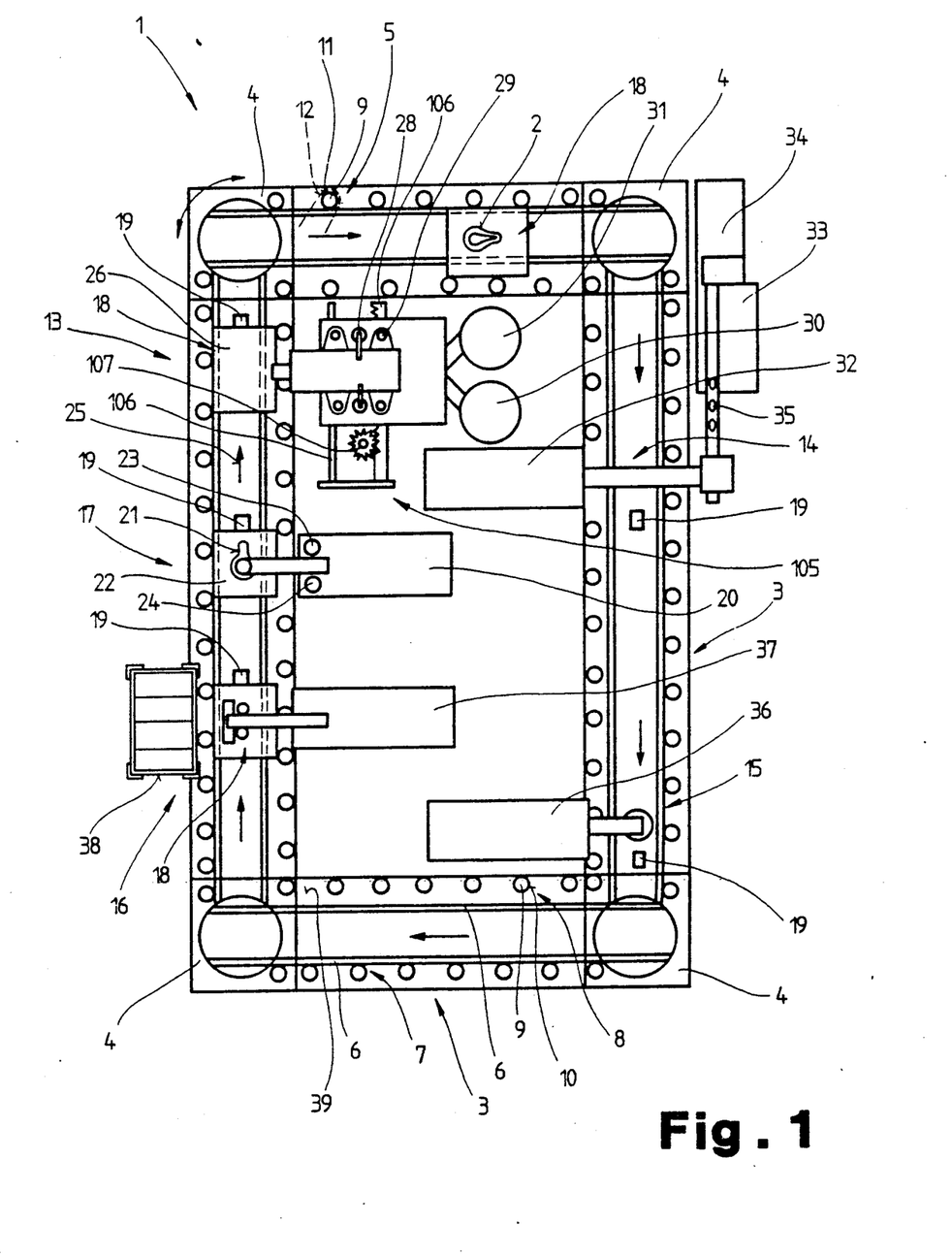
FIG. 1 is a simplified, diagrammatic plan view of an apparatus, in accordance with the invention, for manufacturing mouldings of plastics material.

An apparatus 1 for manufacturing mouldings 2 from plastic material is shown in FIG. 1. The apparatus 1 may comprise a plurality of table modules 3 and guide modules 4. The term "module" refers to an operative unit. For this purpose, a table module 3 comprises at least one table plate, a trestle and a guideway for the workpiece carriers. The guide module 4 additionally has a unit for guiding workpiece carriers. A possible embodiment of this table module 3 and guide module 4 is described in, for example, the same Applicant's DE-PS 27 56 422, DE-PS 27 60 217, DE-OS 35 02 868 and DE-OS 35 02 820, to which reference is made to avoid repetition and which are at the same time made the subject-matter of the present application.

These table modules 3 and guide modules 4 also comprise a conveyor 5 having vertical guideways 6 and lateral guideways 7, 8. While the lateral guideway 8 is formed by guide rollers 10 rotatably mounted on vertical axles 9, the lateral guideway 7 in the embodiment shown in FIG. 1 comprises pressure rollers 11 which are resiliently deformable in a radial direction and may also be rotated about axles 9 by way of a drive system 12. Reference is made to the same Applicant's DE-PS 27 56 422, DE-PS 27 60 217, DE-OS 33 04 091 and DE-OS 34 11 452 to avoid repetition with regard to possible arrangements and constructions of the guide- and pressure rollers 10, 11 and of the vertical guideways 7 and lateral guideways 8.

Various work stations 13 to 17, in which workpiece carriers 18 may be arrested by way of positioning devices 19 for the purpose of processing, assembly and cleaning, are provided along the table modules 3 and guide modules 4. The description of the apparatus 1 will be commenced in the work station 17 in order to facilitate the description of the sequence of the process at the same time as describing the apparatus 1. A cleaning device 20 is disposed in the work station 17 and comprises, for example, rotating brushes, blowing and suction units by which a mould cavity 21 of a mobile part 22 of a tool may be freed from residues from the preceding operation for manufacturing a moulding 2 and coated with a parting agent. For this purpose, the cleaning device 20 has a reservoir 23 for compressed air and a reservoir 24 for a parting agent. The parting agent is fed by way of lines to the rotating brushes or spray nozzles of the cleaning device 20.

The work station 13 spaced downstream in the feed direction 25 has positioning device 19 by which the workpiece carrier 18 is retained in an accurately predeterminable position. After the workpiece carrier 18 and the mobile part 22 of the tool disposed thereon are located in the exact position, a basic part 26 of the tool is placed on the mobile part 22 of the tool together with a dispensing device 27. The dispensing device 27 is adjusted vertically together with the basic part 26 of the tool by way of an adjusting device 28 operable by, for example, pressure medium, the dispensing device 27 being guided along by guide pillars 29. Tanks 30, 31 are connected to the dispensing device 27 and contain the liquid or solid raw material for the plastic material from which the moulding is manufactured. Thus, the dispensing device 27 may be, for example, a known plastic material injection-moulding machine known in many embodiments from the prior art, or a plastics expanding machine or the like.

The workpiece carrier 18 is then conducted by the guide module 4 from the work station 13 into the work station 14 in which an assembly device 32 is disposed. By way of example, the assembly device is an assembly robot or a handling device having several linear axes adjustable relative to one another in different directions. Component parts 35 fed individually from a store 34 may be positioned in or on the moulding 2 by means of the assembly device 32 by way of a feed device 33. The workpiece carrier 18, is then moved forwards until it abuts against the positioning device 19 in the work station 15. The work station 15 has an associated processing device 36 by which the component 35 may be connected to the moulding 2 by, for example, ultrasonic welding.

The workpiece carrier 18 is then moved into the work station region 16 until it abuts the positioning device 19. An extraction device 37 which, for example, may again be a robot or a handling device, is provided in the work station 16 and grasps the mouldings 2 ejected from the mobile parts 22 of the tool and deposits them individually in a pallet 38 as is shown diagrammatically by way of example, or in bulk.

The workpiece carrier 18 is then conducted from the work station region 16 to the working region 17 again for cleaning and coating the mould cavity with parting agent.

Figure 2:
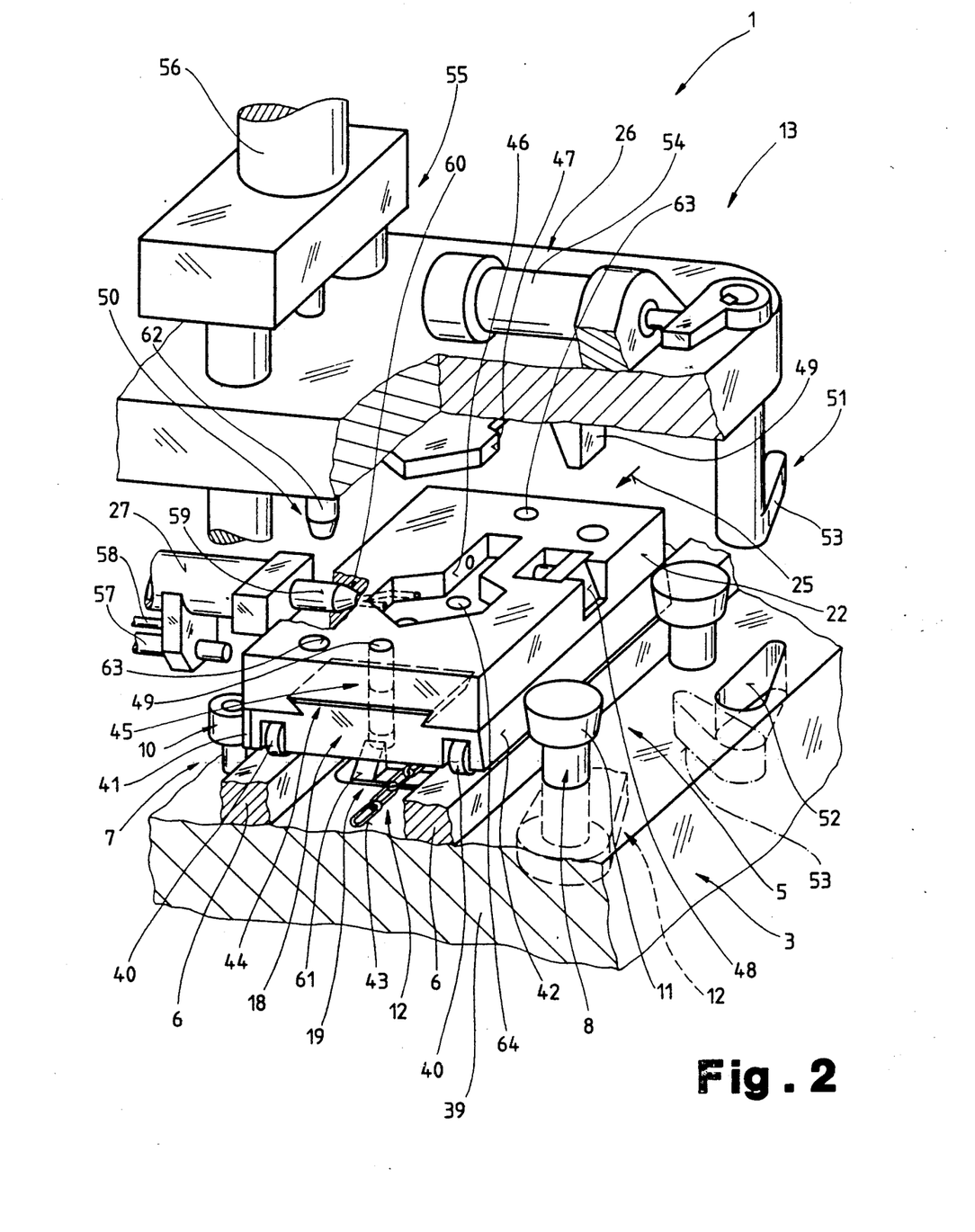
FIG. 2 is highly simplified diagrammatic perspective view of a work station, associated with the dispensing device for the plastic material, of the apparatus in accordance with the invention.

A work station 13 of an apparatus 1 for manufacturing mouldings from plastic material is shown in FIG. 2. This Figure shows the vertical guideways 6 formed by guide bars, the lateral guides 7, 8 of the conveyor 5 which are formed by guide rollers 10 and pressure rollers 11, and a table plate 39 of the table module 3. A workpiece carrier 18 is supported on the vertical guideway 6 by way of guide rollers 40. The guide rollers 10 of the lateral guideway 7 engage support strip 41, for example a hardened steel strip, while the pressure rollers 11, resilient in a radial direction, abut a side flank 42 of the workpiece carrier 18. A chain drive system associated with the pressure rollers 11 serves as the drive system 12, or, as is indicated diagrammatically, a conveying chain 43 is associated with the workpiece carriers 18. The mobile part 22 of the tool is mounted on the workpiece carrier 18 by way of a centering device 44. A locking device 45 in the form of a locating pin is provided for holding the mobile part of the tool accurately relative to the workpiece carrier 18. The mobile part 22 of the tool is provided with a mould cavity 46 which is engaged by a core 47 of the basic part 26 of the tool. Furthermore, a displaceable core 48 is disposed in the mobile part 22 of the tool and, after the core 47 has been inserted into the mould cavity 46, is adjustable transversely of the conveying direction 25 by way of a driver 49 in the basic part 26 of the tool. A centering device 50, which may be formed by centering pins, is provided for centering the basic part 26 of the tool with respect the mobile part 22 of the tool. After the basic part 26 of the tool has been mounted onto the mobile part 22 of the tool, these two parts may be clamped together by locking device 51 having a bolt 53 which engages opening 52. It will be appreciated that locking may be effected relative to the table module 3, the guide module 4 or on reinforcing parts associated therewith, or directly in a support connected to a base. The bolt 53 of the locking device 51 may be swung by a drive 54 out of the position shown by solid lines into the position shown by dash-dot lines in the region of the table plate 39. The clamping surface between the bolt 53 and the table plate 39 may extend obliquely to the vertical guideway 6, so that the clamping action between the basic part 26 of the tool and mobile part 22 of the tool increases with increasing rotation of the bolt 53.

In order to lower the core 47 into the mould cavity 46, the basic part 26 of the tool is displaceable on an adjusting device 55 and at right angles to the feed direction 25 by means of an adjusting drive 56. The liquid or plasticized plastics material is fed by the dispensing device 27 whose feeding direction extends transversely to the conveying direction 25. A nozzle 59 engages a gate 60 of the mobile part 22 of the tool by displacement of the dispensing device 27 along the guide arrangement 57 by means of a feed drive 58 formed by a piston and cylinder arrangement. After the mobile part 22 of the tool has been locked to the basic part 26 of the tool by way of the locking device 51, the liquid or plasticized plastics material may be fed by way of the nozzle 59.

As will be seen from the diagrammatic illustration of the installation in accordance with the invention, which has been greatly simplified for improved comprehension of the function, the locating pin, serving as the locking device 45 between the mobile part 22 of the tool and the workpiece carrier 18, may at the same time be used as a stop pin for a stop 61 of the positioning device 19. It is thereby ensured that the position of the mobile part 22 of the tool can be attained with high precision, irrespective of any tolerances in the workpiece carrier 18.

It will also be seen from the illustration that the pressure rollers 11 are of conical construction and their diameter increases as the distance from the vertical guideway 6 increases. Likewise, the side flank 42 of the workpiece carrier 18 slopes towards the mould cavity 46 as the distance from the vertical guideway 6 increases. The workpiece carrier 18 is guided by the guide rollers 40 without play on the vertical guideway 6 by the cooperation of the conical guide rollers 11 and the side flank 42. At the same time, the workpiece carrier 18 is pressed against the guide rollers 10 without play as a result of the resilient construction of the pressure rollers 11 in a radial direction. This, in conjunction with the stop 61, results in extremely accurate positioning of the mobile part 22 of the tool. The accuracy obtainable is +/−0.01 mm. It is thereby possible to obtain, by means of the centering pins of the locking device 51, the accuracy of 0.001 mm and more required for the cooperation between the basic part 26 of the tool and the mobile part 22 of the tool.

In order to achieve this accurate positioning between the mobile part 22 of the tool and the basic part 26 of the tool, the centering device 50 is provided with a plurality of centering pins 62 which engage centering bores 63 in the mobile part 22 of the tool. An ejector 64 is also indicated diagrammatically in the mould cavity 46 and serves to eject the moulding from the mould cavity 46.

Figure 3:
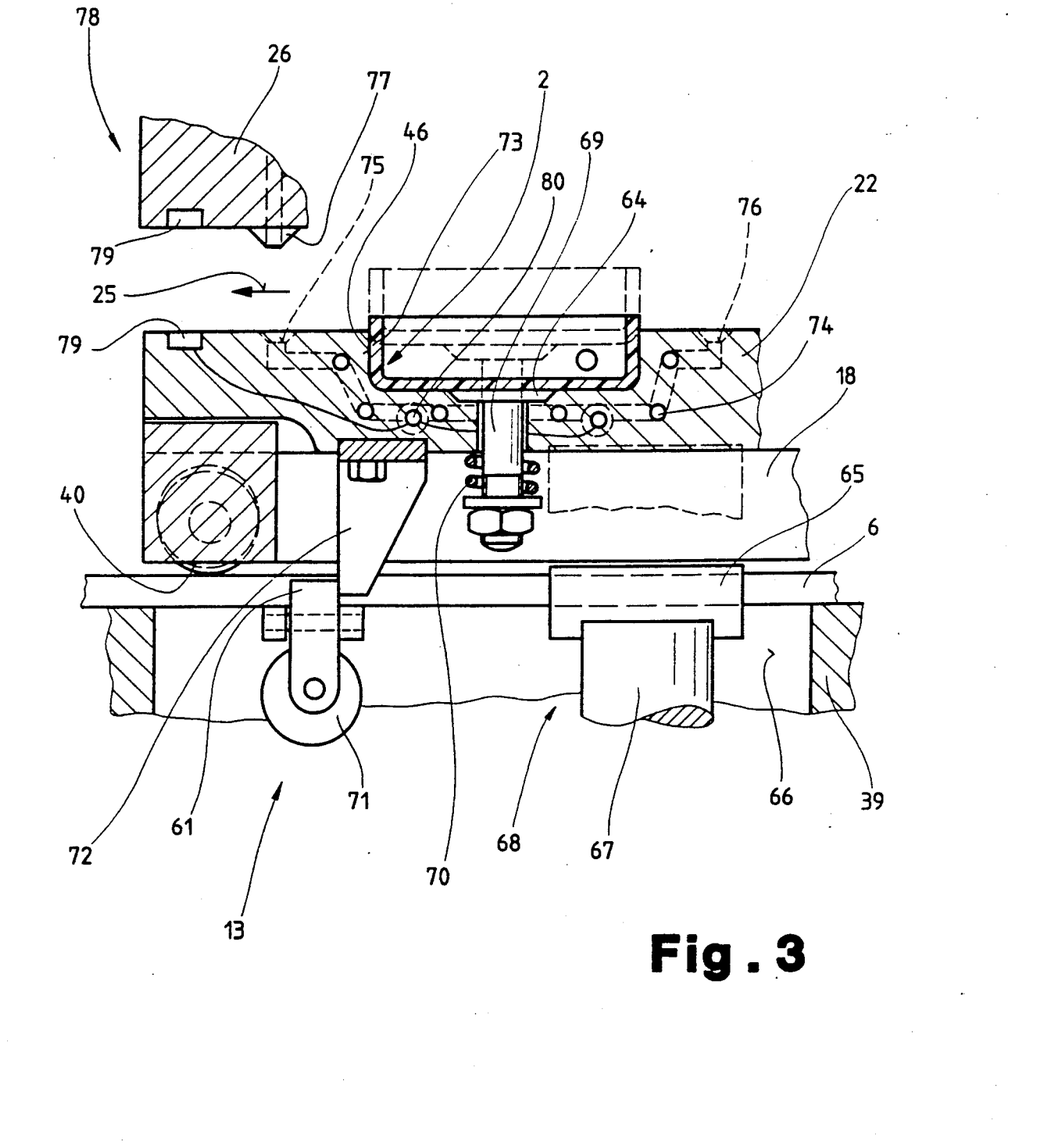
FIG. 3 is a sectioned side elevation of a workpiece carrier, having a mobile part of the tool, constructed in accordance with the invention.

FIG. 3 shows another embodiment of a workpiece carrier 18 in which an ejector 64, such as may be provided in, for example, the work station 16 of FIG. 1, is disposed and which has a support plunger 65. The support plunger 65 is disposed between the vertical guideways 6 in an opening 66 in the table plate 39 in the work station 13 and is connected to a drive device 67. The support plunger 65 and the drive device 67 form a support device 68 by which the mobile part 22 of the tool or the workpiece carrier 18 may be supported independently or in addition to the vertical guideways 6. A part of the closing force, or the entire closing force, may thereby be diverted directly into the base or the trestle, by-passing the guide rollers 40. This can prevent overstressing of the guide rollers 40 and of the trestle. The ejector 64 is retained in its rest position, shown by solid lines, by way of an actuating pin 69 by means of a spring 70, such as the illustrated a helical spring. After the workpiece carrier 18 together with the mobile part 22 of the tool has been positioned by cooperation of the stop 61, pivotable transversely to the conveying direction 25 by-way of a drive 71, with a stop member 72 disposed in the mobile part 22 of the tool, the support plunger 65 may be displaced by the drive device 67 from the position shown by solid lines into the position shown by dash-dot lines. The guide rollers 40 are thereby relieved of load and raised by 0.1 to 0.5 mm for example, as is shown in a greatly exaggerated manner by dash-dot lines, and the basic part 26 of the tool is then supported on the support device 68. The plastic material 73 may be injected in this raised positon. After the support plunger 65 has been retracted by the drive device 67 into the position shown by solid lines, the workpiece carrier 18 is released and may be moved to the next work station.

As is also shown in this illustration, bores 74 may be disposed in the mobile part 22 of the tool and be connected to coupling members 77 of a basic part 26 of the tool by way of inlets 75 and outlets 76. It is thereby possible to conduct coolant or heating medium through the bores 74, at least whilst the basic part 26 of the tool is connected to the mobile part 22 of the tool, so that the mould cavity 46 may be kept at a desired temperature. The coolant or heating medium may be removed by blowing air through immediately before the moulding tool 78 comprising the mobile part 22 of the tool and the basic part 26 of the tool, is opened. It is likewise possible, to supply heating elements 80 with electrical energy by way of contacts 79 which are closed when the basic part 26 of the tool is placed onto the mobile part 22 of the tool, in order to ensure that the mobile part of the tool is suitably heated. It will be appreciated that it is also possible to dispose the contacts 79 in the region of the side faces of the workpiece carrier or on the underside thereof, so that permanent heating of the mould is possible in the various work stations, so that the mould cavity 46 is always at approximately the desired temperature. It is likewise possible to supply the bores 74 constantly with coolant over a long region of the conveyor, so that cooling of the moulding 2 may be controlled to the desired extent.

Figure 4:
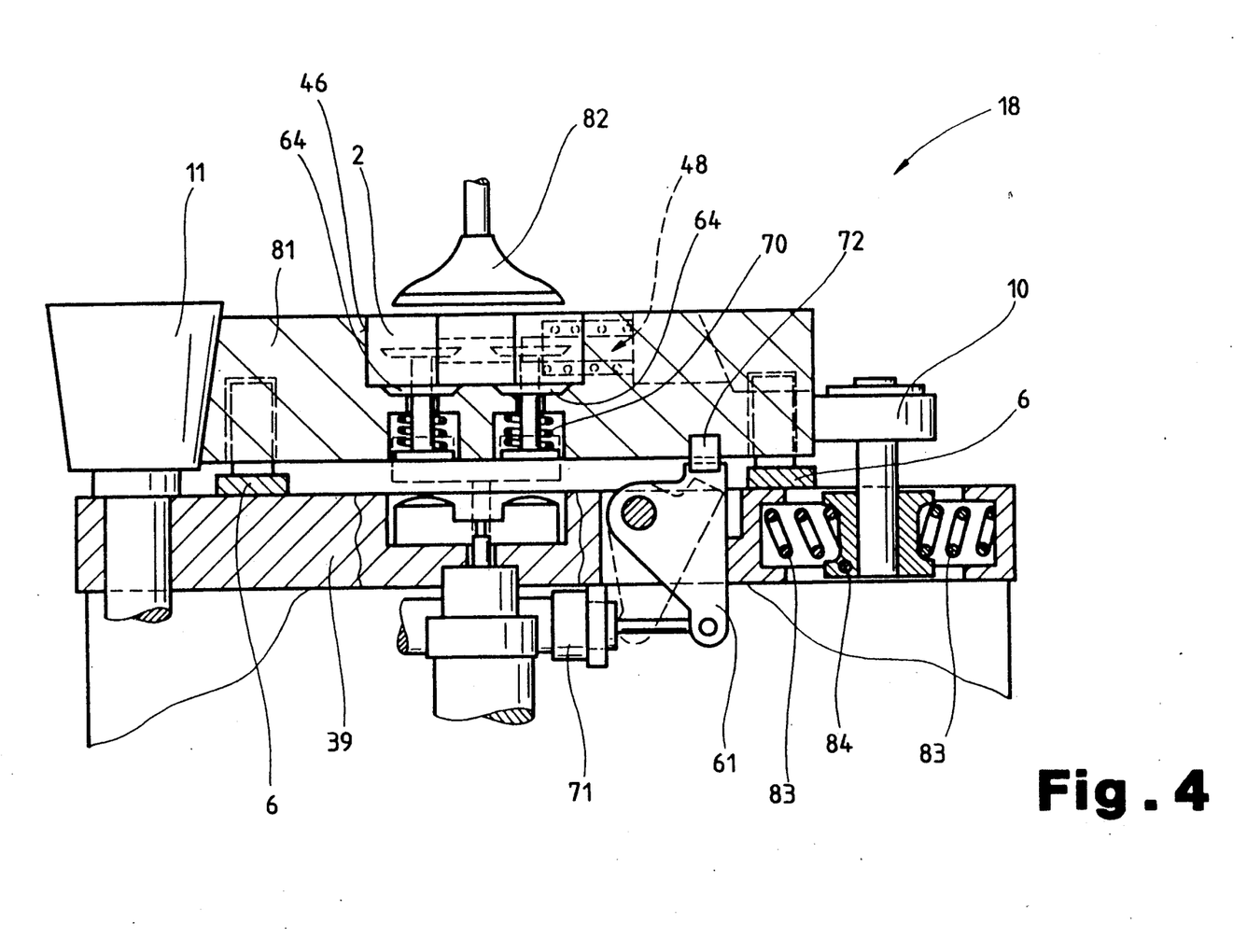
FIG. 4 is a partially sectioned front elevation of a workpiece carrier having a mobile tool part constructed in accordance with the invention, in a work station for ejecting the moulding.

A further embodiment of a workpiece carrier 18 is shown in FIG. 4. In this case, the workpiece carrier is constituted directly by a mobile part 81 of the tool. As already explained with reference to FIGS. 1 and 2, it is guided laterally without play between guide rollers 10 and pressure rollers 11, and vertically by way of vertical guideways 6. A moulding 2 is disposed in a mould cavity 2. A core 48 is introduced into the mould cavity 46 whilst the plastic material is being injected into the mould cavity 46, and is retracted into the position shown by dash-dot lines after the tool has been opened.

Ejectors 64 are provided for ejecting the moulding 2 from the mould cavity 46 and are held by springs 70 in their position shown by solid lines. The ejectors 64 may be displaced into the position shown by dash-dot lines by means of a plunger which may be displaced upwardly at right angles to the table plate 39 by means of a drive device such a pressure-medium-operated cylinder and piston arrangement, and press the moulding, already grasped by a vacuum-type gripper 82 of a handling device, out of the mould cavity 46. As may be seen from this illustration, the conveying cross section of the workpiece carrier is free after the plunger has been moved into its rest position shown by solid lines. The construction of the ejector 64 corresponds to the construction shown in FIG. 3.

It may also be seen from this illustration that the stop 61 is displaceable by the drive 71 about a spindle, extending parallel to the conveying direction 25, from the stop position shown by solid lines and cooperating with the stop member 72, into the rest position indicated by dash-dot lines. When in this position, the stop 61 and the stop member 72 are disengaged.

It is also shown diagrammatically in this Figure that the guide roller 10 is floatingly mounted on both sides in the table plate 39 by way of springs 83. The springs 83 have a very large spring force, so that a substantially larger adjusting force than the pressure force exerted by the pressure rollers 11 during normal operation is required to adjust the springs 83 in order to change the position of the guide rollers 10 relative to the table plate 39. Such a force occurs when, for example, the basic part 26 of the tool is coupled to the mobile part 81 of the tool, since a very large closing force is required to press the parts of the tool together. If adaptation of the position of the mobile part 81 of the tool is necessry if the mobile part 81 of the tool is not positioned with 100% accuracy relative to the basic part 26 of the tool, the position of the springs 83 may be correspondingly varied by the large closing force applied during the closing operation, so that the mobile part 81 of the tool can adjust its position relative to the basic part 26 of the tool within narrow limits.

In installations with extreme high accuracy for the guidance of the parts of the tool, it is also possible during entry of the workpiece carrier 78 into the work station, to cut out the action of the springs 83 by means of a spring locking device which may be in the form of a locking pin 84. If the the mobile part 81 of the tool or the workpiece carrier 18 is positioned in the work station, the locking of the guide roller 10 effected by the lockign pin 84 may be cancelled, so that, when closing the tool, that is, when placing the basic part of the tool onto the mobile part 81 of the tool, the latter can move within narrow limits.

Figure 5:
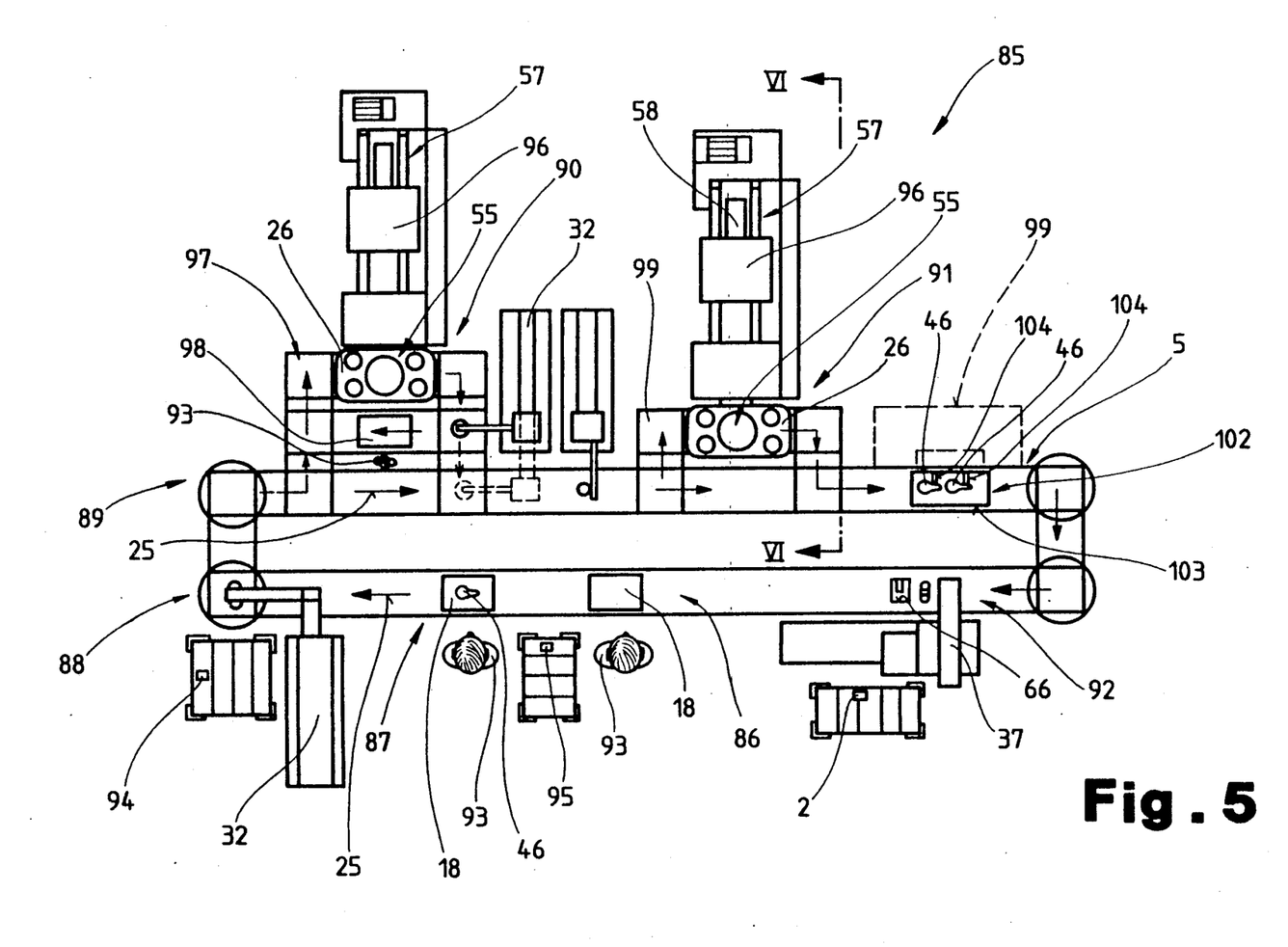
FIG. 5 is simplified diagrammatic plan view of another embodiment of an apparatus for manufacturing mouldings of plastics material.

Another embodiment of an apparatus 85 for manufacturing mouldings from plastics material is shown in FIG. 5. The apparatus 85 includes a conveyor 5 of rectangular shape and Several work stations 86 to 92 are disposed along the conveyor 5. The work stations 86 and 87 are manual working places in which the parts are manipulated, and the workpiece carriers 18 or the mould cavities 46 are handled, by workers 93. A part 94 which is to be extruded, or to be injected into the plastic part, is automatically fed into the work station 88 by, for example, an assembly device 32 and is inserted into the mould cavity 46. This may also be done in addition to the parts 95 inserted by the workers 93, or a part is inserted only in the region of the assembly device 32.

The workpiece carriers 18 prepared in this way are sprayed with, for example, a bonding agent or a parting agent in the work station 89 and are brought to the working regions 90 or 91 by the conveyor 5. Injection-moulding machines 96 for plastic material or metals are disposed in the working stations 90 and 91. While the injection-moulding machine 96 has an individual asssoicated conveyor 97 also with, for example, individual workpiece carriers 98, an additional conveyor 99 for the workpiece carriers 18 is provided in the region of the injection-moulding machine 96 and extends parallel to the conveyor 5. Guide modules 4, such as those shown in FIG. 1 by way of example, or shift modules known fromthe prior art, serve to transfer the workpiece carriers to the conveyor 99. The workpiece carriers 98 may be circulated in the region of the conveyor 97 fully independently of the workpiece carriers 18 on the conveyor 5, the workpiece carriers 98 also having a mobile part of the tool or being constituted by the latter. Alternatively, however, the workpiece carriers 18 may be diverted to the conveyor 97, 99 by turntables, as is shown by dash-dot arrows, and returned to the conveyor 5 after passing through the injection moulding machine 36. However, after the mould cavity has been filled with plastic material, the moulding 2 is transferred to a workpiece carrier 18 in the region of an assembly device 32 which may be a handling unit. Alternatively, however, it is also possible, for example, to transfer mobile parts of the tool, prepared in the work station 89, from the workpiece carriers 18 to the workpiece carriers 98. Alternatively, a worker 93 for transferring the mouldings or the mobile parts 22, 81 of the tool may be provided between the conveyor 97 and the conveyor 5 instead of the assembly device 32. However, in principle, the sequence of manufacturing the moulding 2 in the region of the injection-moulding machine 96 is the same as that described with reference to FIGS. 1 to 4.

On the other hand, the arrangement, in conjunction with the injection-moulding machine 96 in the work station 91, is such that the workpiece carriers 18, together with their mould cavities 46, are removed from the conveyor 5 onto the conveyor 99 where they are conducted to the basic part 26 of the tool and positioned therebelow. The adjusting device 55 for the basic part 26 of the tool and the guide arrangement 57 for the dispensing device 27 or the nozzle 59 are shown for both the injection-moulding machines 96. When a mould cavity 46 has been filled with plastic material in the working region 18, the workpiece carriers 18, together with the mobile part 22, 81 of the tool, are returned to the conveyor 5. A drive for an ejector 64 in the opening 66 in the table plate 39 and a device 37 for removing the mouldings 2 from the mould cavity 46 of the workpiece carier 18, may then the provided in the work station 92. Furthermore, a stop 61 for positioning the workpiece carrier 18 over the drive for the ejector 64 is disposed in an opening 66.

At the same time, the mould cavity 46 may be cleaned and parting agent may be introduced in this region. However, it will be appreciated that it is also possible to remove the mouldings 2 and to clean the mould cavities 46 by workers 93, while the unhealthy and dirty work of introducing the parting agent is done mec'nically in a following work station .

It will be seen from the description of the apparatus 1 and the apparatus 85, shown in FIGS. 1 and 5 respectively, and the variants, described therein, of the working regions disposed in the course of the conveyors, that, in conjunction with conveyors 5 and 97 of this type, the dispensing devices 27 and the injection-moulding machines 96 may be exploited and used to substantially better advantage from the technical and organisational viewpoint for the mass-production of parts. In particular, it is thereby possible to shorten the cycle times of machines of this type and to automate the associated working operations such as inserting parts, cleaning the moulds, introducing a parting agent and the like in conjunction with the charging of the injection-moulding machines 96, or to integrate manual working places in the course of a loose interlinkage.

Figure 6:
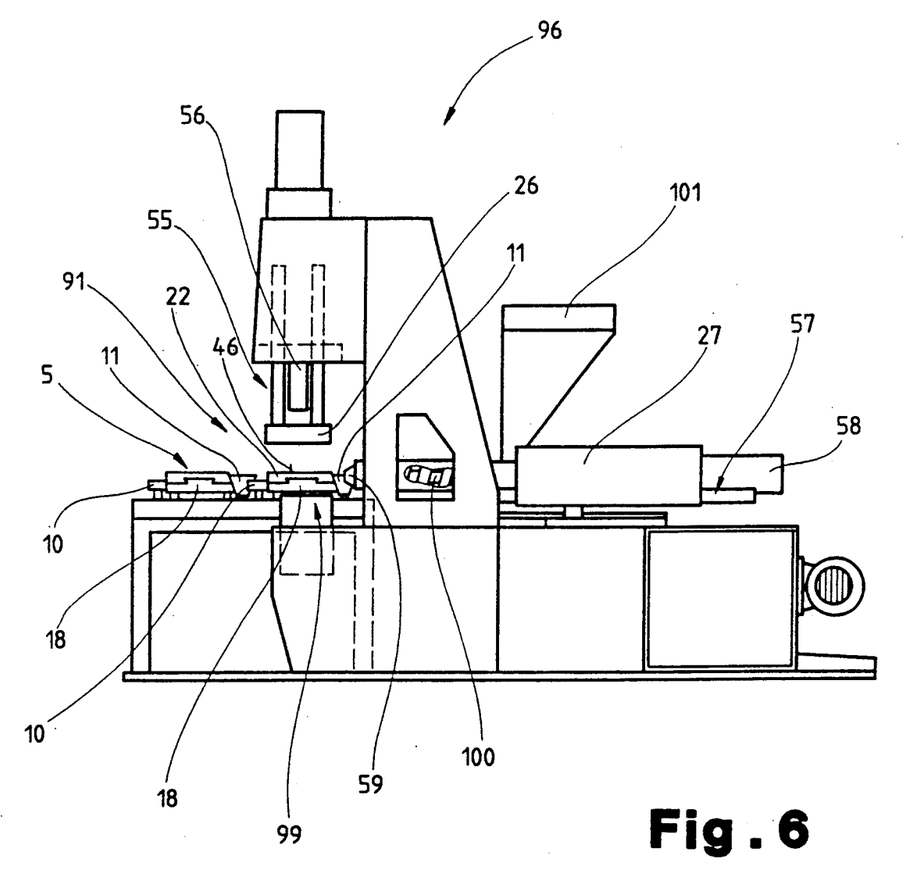
FIG. 6 is a front elevation of the installation in the region of a dispensing device, partially sectioned along the lines VI—VI of FIG. 5.

An injection-moulding machine 96 in the working region 91 is shown in FIG. 6. This Figure shows the two mutually parallel guideways of the conveyor 5 and the conveyor 99. Several injection-moulding machines 96, disposed parallel to one another, of the same conveyor 5 may be provided with mobile parts of the tool by providing several conveyors 99 located one behind the other and parallel to the conveyor 5, as is shown diagrammatically be dash-dot lines in FIG. 5. That is, whilst a workpiece carrier 18 has stopped in the region of the injection-moulding machine 96 on the conveyor 99, it is possible for another workpiece carrier 18 on the conveyor 5 to pass the occupied injection-moulding machine 96 and to be conveyed to the following injection-moulding machine 96. It is likewise possible to convey mobile parts of the tool, provided with mouldings, undistrubed by the function of the injection-moulding machines 96 disposed one behind the other. It will be seen that the workpiece carriers 18 are guided and moved forwards both on the conveyor 99 and on the conveyor 5 by means of the guide rollers 10 and pressure rollers 11 already described with reference to the preceding Figures. Alternatively, however, the forward movement may be effected by drives such as chains, friction belts or the like, which are independent of the guide rollers 10 and the pressure rollers 11. The dispensing device 27 provided with the nozzle 59 is displaceable along guide pillars of a guide arrangement 57 by means of a drive 58, this displacement being effected at right angles to the conveying direction 25 in the region of the dispensing device 27, but in the same plane as the conveying plane. The basic part 26 of the tool may be displaced relative to the mobile part 22 of the tool disposed on the workpiece carrier 18 and at right angles to the conveying plane of the conveyor 5 or the conveyor 99 by means of the adjusting device 55 which is likewise formed by guide pillars and a adjusting drive 56. As a result of this distribution of the movements of the nozzle 59 and of the basic part 26 of the tool and of the mobile part 22 of the tool in directions at right angles to one another, the parts may be moved towards one another simultaneously and, despite this, collisions between the individual parts, and damage to them, is prevented. As is indicated diagrammatically, the dispensing device 27 may be provided with a worm 100 by which, for example, a granulated plastic material contained in a silo 101 may be plasticized in order to be fed through the nozzle 59 to the mould cavity 46 by actuation of the worm 100.

It will be appreciated that it is possible to interlink injection-moulding machines for metals, such as diecasting machines for aluminium and the like, in a corresponding manner instead of the described injection-moulding machines 96 for plastic material, and it is also possible to interlink machines, which make it possible to change the shape of parts by pressing operations or the like with simultaneous thermal action or by deep-drawing, by way of a conveyor in the manner in accordance with the invention.

As is shown by way of example on a workpiece carrier 102 in FIG. 5, a mobile part 103 of the tool may be provided with several mould cavities 46 which are disposed one behind the other and each of which is provided with an individual runner or gate 104. The mould cavities 46 may be connected in succession to the dispensing device 27 or the nozzle 59 of the injection-moulding machines 96 by way of the gates 104. Alternatively, however, it is possible to connect groups of mould cavities 46 simultaneously to a single dispensing device 27. In addition, these mould cavities 46 disposed on one workpiece carrier 102 may be connected to a basic part 26 of the tool simultaneously or in succession in groups. The advantage of this arrangement primarily resides in the fact that, in the case of longer moulding times of the mouldings 2, conditioned by manufacture or material, in the mould cavities 46, this disadvantage with respect to time may be reduced by filling several mould cavities 46 with plastic material in succession, so that the period of time which has to be waited in the case of the last moulding before opening the mould, or removing the mobile part 103 of the tool from the basic part 26 of the tool, is distributed to the entire period of manufacture of the mould cavities 46 disposed in a mobile part 103 of the tool.

As is also indicated diagrammatically in FIG. 1, it is possible to dispose the basic part 26 of the tool or the dispensing device 27 on a follow-up device 105 constituted by guideways 106 and a follow up drive 107. By virtue of the fact that the dispensing device 27 and the basic part 26 of the tool are movable on the follow-up device 107 parallel to the conveying direction 25 by means of the follow-up drive 107, it is possible for the workpiece carrier or the mobile part 22 of the tool and the basic part 26 of the tool to move uniformly along the conveyor 5 or the vertical guideway 6 whilst plastic material is being injected into the mould cavity. Thus, the times for arresting the workpiece carriers 18 and for starting and acceleration can be saved, whereby the station time may be additionally increased.

I claim:

1. A process for manufacturing moldings of plastic material, which comprises successive cycles of conveying a succession of mobile molding tool parts independently of each other along lateral and vertical guideways of a conveyor to a work station holding a basic molding tool part, each mobile molding tool part defining a molding cavity, and each cycle comprising the steps of joining the mobile molding tool part and the basic molding tool part together at the work station to close the mold cavity, dispensing the plastic material into the closed mold cavity from a dispensing device, connecting the mobile tool part in the work station to a temperature control circuit to impart a predetermined temperature to the mold cavity to permit the plastic material in the mold cavity to harden into a shape-retaining molding, separating the basic molding tool part from the mobile molding tool part after the molding has hardened, conveying the mobile molding tool part holding the molding in the mold cavity thereof independently of succeeding mobile molding tool parts to at least one succeeding work station for further treatment, and ejecting the monding from the mold cavity.

2. The process of claim 1, comprising the further steps of adjusting the basic molding tool part with respect to the lateral and vertical guideways.

3. The process of claim 1, comprising the further step of transmitting a portion of the force required to join the molding tool parts together to close the mold cavity to a base supporting the guideways of the conveyor.

4. The process of claim 1, comprising the further step of adjusting the dispensing device perpendicularly to the conveyor.

5. The process of claim 1, comprising the further steps of conveying the mobile molding tool parts without play along lateral and vertical guideways, positioning each mobile molding tool part in alignment with the basic molding tool part at the work station, joining the molding tool parts by pressing the basic molding tool part against the mobile molding tool part while the parts are centered with respect to each other, and separating the basic molding tool part from the mobile molding tool part after the molding has hardened by lifting the basic molding tool part off the mobile molding tool part.

6. The process of claim 1, wherein the molding is ejected from the mold cavity in a work station succeeding the work station holding the basic molding tool part.

7. The process of claim 1, comprising the further steps of disposing a plurality of the mobile molding tool parts on a workpiece carrier, joining the mobile molding tool part and the workpiece carrier together at the work station to close the mold cavities of the mobile molding tool parts, and successively dispensing the plastic material into the closed mold cavities from the dispensing device.

8. The process of claim 1, wherein the further treatment comprises the steps of assembling the molding with additional parts.

9. The process of claim 1, comprising the further steps of cleaning the mold cavity after the molding has been ejected and coating the cleaned mold cavity with a parting agent.

10. The process of claim 9, comprising the further steps of positioning an assembly part in the cleaned mold cavity before the mobile molding tool part is conveyed to the work station holding the basic molding tool part.

11. The process of claim 1, comprising the further steps of conveying the mobile molding tool part with the molding to a work station wherein the molding is manually removed from the mold cavity.

12. The process of claim 1, wherein the further treatment at a succeeding one of the work stations comprises a thermal treatment.

13. An apparatus for manufacturing moldings of plastic material, which comprises a succession of like mobile molding tool parts spaced from each other along a conveyor for conveying the mobile molding tool parts independently of each other to a work station, a basic molding tool part at the work station, each mobile molding tool part defining a molding cavity, means for joining the mobile molding tool part and the basic molding tool part together at the work station to close the mold cavity and for separating the molding tool parts, a device for dispensing the plastic material into the closed mold cavity, a temperature control circuit connected to the mobile tool part in the work station for imparting a predetermined temperature to the mold cavity to permit the plastic material in the mold cavity to harden into a shape-retaining molding, means for positioning the mobile molding tool part in the work station, means for adjusting the relative position of the molding tool parts to each other at the work station, at least one succeeding work station along the conveyor for further treatment of the molding, and means for ejecting the molding from the mold cavity.

14. The apparatus of claim 13, further comprising a succession of workpiece carriers spaced from each other along the conveyor, each workpiece carrier carrying a respective one of the mobile molding tool parts.

15. The apparatus of claim 13, further comprising a stop at the work station for centering the mobile molding tool part with respect to the basic molding tool part.

16. The apparatus of claim 13, further comprising a guide displaceably mounting the dispensing device and an adjustment drive connected to the dispensing device for displacing the device along the guide.

17. The apparatus of claim 16, wherein the adjusting means, the guide and the conveyor extend perpendicularly to each other.

18. The apparatus of claim 13, wherein the conveyor includes lateral and vertical guideways supporting the mobile molding tool parts, and drive means for conveying the mobile molding tool parts therealong.

19. The apparatus of claim 13, comprising a succession of work stations spaced from each other along the conveyor for the further treatment.

20. The apparatus of claim 13, further comprising a drive means at the work station holding the basic molding tool part for operating the ejecting means.

21. The apparatus of claim 13, further comprising an assembly device at a succeeding work station for assembling parts with the molding.

22. The apparatus of claim 13, further comprising a processing device at a succeeding work station for processing the molding in the mold cavity.

23. The apparatus of claim 13, further comprising a cleaning device at a succeeding work station for cleaning the mold cavity.

24. The apparatus of claim 13, further comprising a guide for the basic molding tool part, the guide extending parallel to the conveyor.

25. The apparatus of claim 13, wherein at least some of the mobile molding tool parts define a plurality of said mold cavities spaced from each other successively in the direction of the conveyor.

26. The apparatus of claim 13, further comprising inserts removably disposed in the mold cavity.

* * * * *